(12) United States Patent
McDonald et al.

(10) Patent No.: US 11,507,952 B1
(45) Date of Patent: Nov. 22, 2022

(54) MOBILE PAYMENT SIGNATURE PROCESSING

(71) Applicant: Amazon Technologies, Inc., Seattle, WA (US)

(72) Inventors: Marilyn L. McDonald, Seattle, WA (US); Jesper M. Johansson, Seattle, WA (US); Chad M. Larsen, Seattle, WA (US); Micheal Leavitt, Redmond, WA (US)

(73) Assignee: Amazon Technologies, Inc., Seattle, WA (US)

( * ) Notice: Subject to any disclaimer, the term of this patent is extended or adjusted under 35 U.S.C. 154(b) by 1488 days.

(21) Appl. No.: 15/297,235

(22) Filed: Oct. 19, 2016

Related U.S. Application Data

(62) Division of application No. 13/628,789, filed on Sep. 27, 2012, now abandoned.

(51) Int. Cl.
| | |
|---|---|
| *G06Q 20/40* | (2012.01) |
| *G06Q 20/38* | (2012.01) |
| *H04W 4/14* | (2009.01) |
| *H04W 4/80* | (2018.01) |

(52) U.S. Cl.
CPC ....... *G06Q 20/401* (2013.01); *G06Q 20/3825* (2013.01); *H04W 4/14* (2013.01); *H04W 4/80* (2018.02)

(58) Field of Classification Search
CPC ........ G06Q 40/00; G06Q 40/02; G06Q 20/10; G06Q 20/102; G06Q 20/40; G06Q 20/401; G06Q 20/3825; G06Q 30/04; H04W 4/14; H04W 4/80
USPC ..................................................... 705/39–44
See application file for complete search history.

(56) References Cited

U.S. PATENT DOCUMENTS

| | | | | | |
|---|---|---|---|---|---|
| 4,128,829 | A | * | 12/1978 | Herbst ...................... | G07C 9/35 382/120 |
| 5,054,088 | A | * | 10/1991 | Gunderson ............ | G07C 9/247 382/120 |
| 5,828,772 | A | | 10/1998 | Kashi et al. | |
| 6,148,093 | A | * | 11/2000 | McConnell .............. | G07C 9/35 382/119 |

(Continued)

OTHER PUBLICATIONS

Oldham, D. R. (2001). Biometric identification for dynamic signature verification using time delay neural networks. Available from ProQuest Dissertations and Theses Professional. (230842950). Retrieved from https://dialog.proquest.com/professional/docview/230842950?accountid=131444 (Year: 2001).*

(Continued)

*Primary Examiner* — Hani M Kazimi
(74) *Attorney, Agent, or Firm* — Lee & Hayes, P.C.

(57) ABSTRACT

A mobile device renders a page that receives input points on a signature provided in conjunction with a mobile payment transaction. The page applies a smoothing algorithm to smooth the input points and create a signature file that more truly represents the actual input signature. The signature file and/or the input points are provided to a payment facilitator for use in completing the mobile payment transaction, performing fraud detection, and potentially for other purposes. Mechanisms are also disclosed for authenticating a buyer device in conjunction with a mobile payment transaction.

20 Claims, 11 Drawing Sheets

(56) References Cited

U.S. PATENT DOCUMENTS

| | | | |
|---|---|---|---|
| 6,236,740 B1* | 5/2001 | Lee | G06Q 20/40 382/119 |
| 7,239,727 B2* | 7/2007 | Taylor | G06K 19/06 382/119 |
| 7,542,593 B1* | 6/2009 | Chaurasia | G06K 9/00167 382/119 |
| 8,089,861 B1* | 1/2012 | Rahim | H04L 63/123 370/216 |
| 8,412,638 B2* | 4/2013 | Yeap | G06Q 20/40975 235/382 |
| 2001/0048743 A1* | 12/2001 | Machida | H04L 9/3247 380/30 |
| 2002/0163510 A1 | 11/2002 | Williams et al. | |
| 2003/0001818 A1* | 1/2003 | Katagiri | G06F 21/32 345/158 |
| 2003/0045353 A1* | 3/2003 | Paulsen | G07F 17/3241 463/40 |
| 2003/0182585 A1* | 9/2003 | Murase | G06F 21/32 726/3 |
| 2005/0020303 A1 | 1/2005 | Chan | |
| 2005/0086483 A1 | 4/2005 | Singh et al. | |
| 2005/0238244 A1 | 10/2005 | Uzawa | |
| 2007/0292002 A1* | 12/2007 | Kaplan | G06V 40/394 382/119 |
| 2008/0037842 A1* | 2/2008 | Gutta | G07C 9/257 382/119 |
| 2009/0003705 A1 | 1/2009 | Zou et al. | |
| 2010/0063922 A1* | 3/2010 | Evans | G06Q 20/40 705/40 |
| 2011/0228991 A1 | 9/2011 | Hicks et al. | |
| 2012/0116972 A1* | 5/2012 | Walker | G06Q 20/40 705/44 |
| 2012/0256944 A1* | 10/2012 | Crumly | G06V 30/1423 345/611 |
| 2012/0257249 A1* | 10/2012 | Natarajan | G06F 16/93 358/1.15 |

OTHER PUBLICATIONS

Office Action for U.S. Appl. No. 13/628,789, dated Jan. 15, 2015, Marilyn L. McDonald, "Mobile Payment Signature Processing ", 21 pages.

Office action for U.S. Appl. No. 13/628,789, dated Jan. 15, 2016, McDonald et al., "Mobile Payment Signature Processing", 24 pages.

Office action for U.S. Appl. No. 13/628,789, dated Jul. 28, 2016, McDondald et al., "Mobile Payment Signature Processing", 28 pages.

Final Office Action for U.S. Appl. No. 13/628,789, dated Aug. 12, 2015, Marilyn L. McDonald, "Mobile Payment Signature Processing", 24 pages.

* cited by examiner

MOBILE PAYMENT SIGNATURE PROCESSING

CROSS-REFERENCE TO RELATED APPLICATION

This application is a divisional of U.S. patent application Ser. No. 13/628,789, filed Sep. 27, 2012, titled "Mobile Payment Signature Processing", the entire disclosure and contents of which are hereby incorporated by reference herein.

BACKGROUND

Many types of computing devices include touch screens for capturing touch input. For example, point-of-sale ("POS") devices frequently include touch-based terminals for capturing a customer signature and potentially other types of input. Some touch screen devices utilized for signature capture are, however, only capable of capturing a relatively low number of input points per second or other unit of time.

Captured input can look blocky or jagged when displayed on devices that capture only a relatively low number of input points per unit of time. This may be frustrating to a customer providing input to such a device. For instance, a customer might be confused if they create their signature as they normally would but are presented with a displayed image of their signature that is blocky or jagged to the point of being unrecognizable. A blocky or jagged signature might also impact the merchant collecting the signature because a very blocky or jagged signature might be inappropriate for use in fraud detection or other business purposes.

It is with respect to these and other considerations that the disclosure made herein is presented.

DETAILED DESCRIPTION

Figure 1:
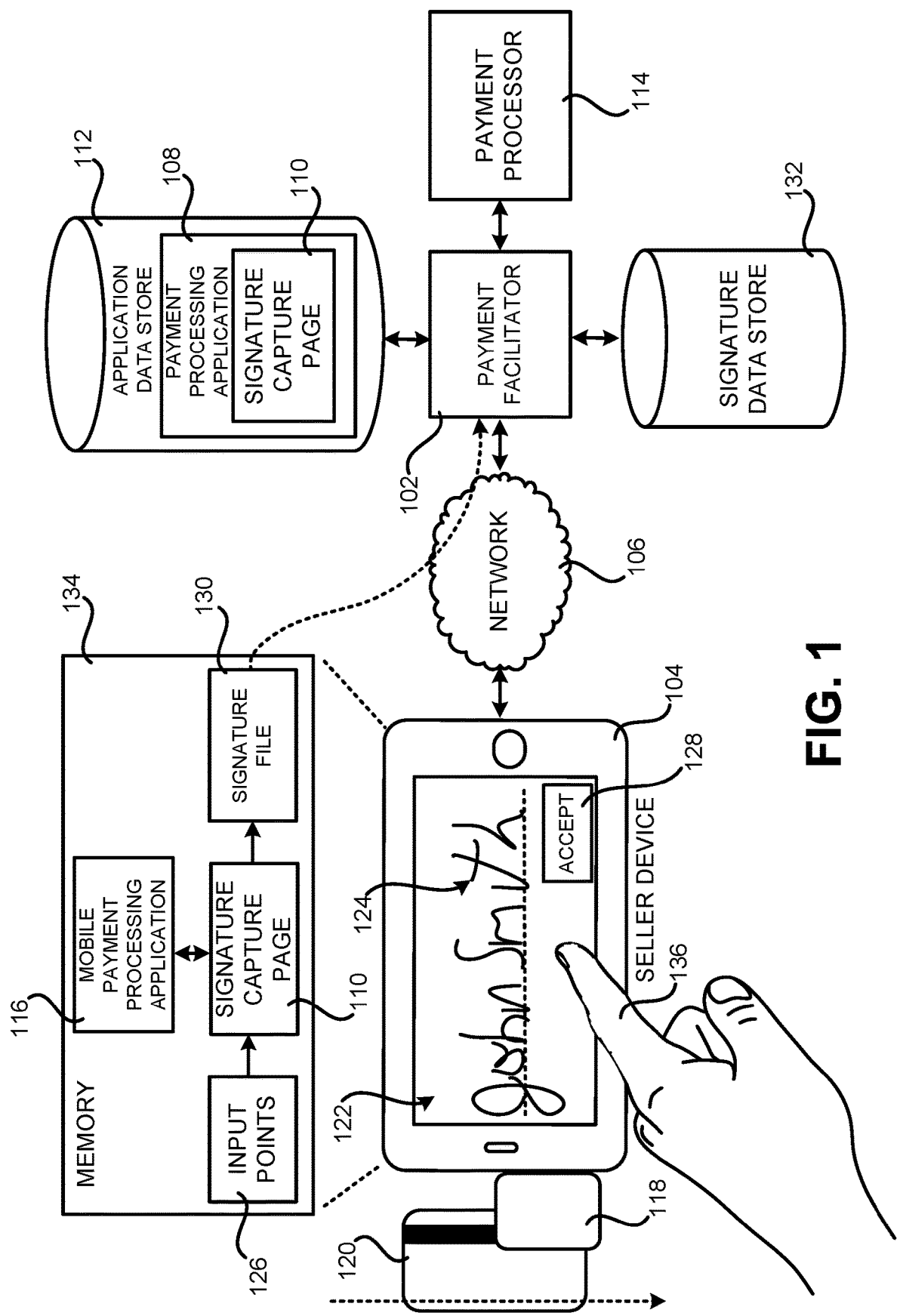
FIG. 1 is a system diagram showing aspects of one mechanism disclosed herein for capturing a signature utilizing a Hypertext Markup Language 5 ("HTML5") application, according to one embodiment presented herein.

The following detailed description is directed to technologies for payment signature processing. Utilizing the technologies described herein, a signature provided in conjunction with a mobile payment can be captured and "smoothed" such that the signature appears to be a truer representation of an actual signature, even when the number of captured input points is relatively low. The captured signature may be utilized for various purposes, including completion of a mobile payment, fraud detection, user and/or device authentication, and others. Additional details regarding these and other aspects of the concepts and technologies disclosed herein for mobile payment signature processing are provided below.

According to one aspect presented herein, an HTML5 application is provided for payment processing. In particular, one page of the HTML5 application might be provided for capturing a payer (referred to herein as a "buyer") signature in order to complete a payment transaction. This page, referred to herein as a signature capture page, might be retrieved and rendered on a mobile device such as a smartphone or tablet computing device by an application, by a World Wide Web ("Web") browser, or by another component. As will be described in greater detail below, the signature capture page is configured to receive input points of a signature, to smooth the input points, and to provide a file containing the smoothed signature to a payment facilitator for use in completing a payment. The file might be an image file or a file with other types of data from which the signature can be recreated, such as a vector graphics format file.

In order to receive a signature, the signature capture page receives input points from a digitizer in a touch screen device. For instance, a payer completing a mobile payment transaction might utilize their finger or a stylus to draw their signature on a touch screen. The digitizer in the touch screen device reads input points in response to the touch input and provides the input points to the signature capture page. In response thereto, the signature capture page generates an HTML5 canvas and utilizes the received input points to display the signature on the HTML5 canvas. When the user has completed their signature, the signature capture page renders the signature to a signature file and transmits the file to a payment facilitator for use in completing the transaction and, potentially, for other purposes. The signature capture page might also transmit the input points and other captured data to the payment facilitator.

In order to generate a smoothed signature, the signature capture page is configured in one implementation to obtain three input points. The signature capture page then computes a first midway point that is midway between the first and second of the three input points. The signature capture page then computes a second midway point that is midway between the second and third of the three input points. The signature capture page then draws a Bezier curve between the first midway point and the second midway point, with the second of the three input points acting as a control point for the Bezier curve. The first input point is then set to the value of the second input point and the second input point is set to the value of the third input point. A new input point might then be selected as the third input point on the signature. This process may be repeated until all of the input points have been utilized in computing the smoothed signature. Other smoothing algorithms might be utilized in other embodiments. Additionally, more or less than three input points might be utilized at a time in other embodiments.

In some embodiments, the payment facilitator generates the smoothed signature and returns a file containing an image of the smoothed signature or other types of data from which the signature can be regenerated, to a client device, such as a smartphone or tablet device for display. For instance, in these embodiments, the signature capture page is configured to provide the input points to the payment facilitator, such as by streaming the input points to the payment facilitator. In turn, the payment facilitator is configured to smooth the input points to generate a smoothed signature utilizing the mechanism described above or another mechanism. The payment facilitator then renders a signature file containing the smoothed signature and transmits the file to a payee (referred to herein as a "seller") device for display and approval by the buyer.

As mentioned above, the payment facilitator might utilize the image of a signature, the captured input points, and other types of captured data for the signature to perform various tasks, including fraud detection. For instance, in one embodiment the payment facilitator is configured to store data defining a signature, such as the input points, an image of the smoothed signature, or other data. When the payment facilitator receives new input points, an image file, and/or other data in connection with a transaction, the payment facilitator determines whether input points, an image file, and/or other data was previously stored for the same customer. If so, the payment facilitator compares the previously stored data defining the signature with the newly received data. If the stored data defining the signature and the received data defining the signature are identical or within some threshold value of being identical, the payment facilitator declines the transaction. This is because identical data defining a customer signature is likely to indicate a "replay" attack whereby a malicious party is utilizing a previously generated signature in an attempt to perform a fraudulent transaction. As will be described in detail below, a captured signature might also be utilized in conjunction with mechanisms for authenticating a buyer for performing a transaction, such as a mobile payment.

In one embodiment, the payment facilitator is configured to authenticate a buyer and authorize a mobile payment transaction by first receiving a charge request from a seller device, such as a smartphone or tablet device. The charge request might include a buyer's credit card number or data defining another payment instrument, the amount of the charge and, potentially, other information describing the buyer such as their e-mail address or other uniquely identifying information.

In response to receiving the charge request, the payment facilitator is configured to transmit a Short Message System ("SMS") or Multimedia Message System ("MMS") approval request message to a device associated with the buyer, such as a smartphone or tablet device. The message includes content asking the buyer to approve the transaction described in the charge request. The message might also include a hyperlink to a signature capture page for capturing and processing the buyer's signature in the manner described above.

In response to the message, the buyer might authenticate with the payment facilitator using a password or another mechanism and approve or decline the charge request. An SMS or MMS message might then be returned to the payment facilitator indicating whether the buyer has approved or declined the charge request. If the buyer approves the charge request, a signature file might also be returned to the payment facilitator that includes the buyer's signature that has been captured and smoothed in the manner described above. The payment facilitator may then transmit a transaction approval/denial message to the seller device and/or the buyer device indicating whether the buyer approved or denied the charge request. If the buyer approves the charge request, the transaction approval/denial message may include a signature file that includes the signature file containing the buyer's signature.

In another embodiment, a mobile payment transaction is authorized by first transmitting a charge request from the seller device directly to the buyer device. For example, near-field communications ("NFC"), Bluetooth®, or another direct device-to-device communication mechanism might be utilized. Once the buyer device has received the charge request, the buyer may authenticate with the payment facilitator using one or more mechanisms and then be requested to approve or deny the charge request. If the buyer approves the charge request, the buyer device may transmit the charge request and a signature file containing the buyer's signature to a payment facilitator. A pre-shared secret associated with the buyer device might also be transmitted or provided to the payment facilitator in another manner. The payment facilitator may utilize the pre-shared secret and/or other information and/or technologies to authenticate the buyer device.

If the buyer approves the transaction and the payment facilitator is able to authenticate the buyer device using the pre-shared secret, the payment facilitator may then transmit a transaction approval/denial message to the seller device and/or the buyer device indicating whether the buyer approved or denied the charge request. If the buyer approves the charge request, the transaction approval/denial message may include the signature file that includes the buyer's signature. Other mechanisms might also be utilized to authenticate a buyer device and to authorize a mobile payment transaction. Additional details regarding the various components and processes described above for mobile payment signature processing will be presented below with regard to FIGS. 1-11.

It should be appreciated that the subject matter presented herein may be implemented as a computer process, a computer-controlled apparatus, a computing system, or an article of manufacture, such as a computer-readable storage medium. While the subject matter described herein is presented in the general context of program modules that execute on one or more computing devices, those skilled in the art will recognize that other implementations may be performed in combination with other types of program modules. Generally, program modules include routines, programs, components, data structures, and other types of structures that perform particular tasks or implement particular abstract data types.

Those skilled in the art will also appreciate that aspects of the subject matter described herein may be practiced on or in conjunction with other computer system configurations beyond those described herein, including multiprocessor systems, microprocessor-based or programmable consumer electronics, minicomputers, mainframe computers, handheld computers, personal digital assistants, e-readers, cellular telephone devices, special-purposed hardware devices, network appliances, and the like. The embodiments described herein may be practiced in distributed computing environments, where tasks are performed by remote processing devices that are linked through a communications network. In a distributed computing environment, program modules may be located in both local and remote memory storage devices.

In the following detailed description, references are made to the accompanying drawings that form a part hereof, and that show, by way of illustration, specific embodiments or examples. The drawings herein are not drawn to scale. Like numerals represent like elements throughout the several figures (which may be referred to herein as a "FIG." or "FIGS.").

FIG. 1 is a system diagram showing aspects of one mechanism disclosed herein for capturing a signature utilizing an HTML5 application, according to one embodiment presented herein. As shown in FIG. 1, a payment facilitator 102 is provided that implements functionality for facilitating the processing of payments, such as mobile payments initiated on a mobile device. As utilized herein, the term "mobile payments" refers to payments that are initiated and/or processed by or in conjunction with a mobile device, such a smartphone or tablet computing device. In this regard, it should be appreciated that aspects of the various embodiments presented herein might also be utilized with other types of computing devices, such as laptop computers, and typically non-mobile devices such as desktop computers.

In order to provide the payment processing services described herein, the payment facilitator 102 maintains an application data store 112. The application data store 112 is utilized to store a payment processing application 108. The payment processing application 108 provides functionality for receiving payment information, processing the payment information, and performing other functionality related to a payment. In order to process the payments described herein, the payment facilitator 102 might interface with a payment processor 114 (e.g., act as a broker between the seller device 104 and the payment processor 114). In certain embodiments, the payment facilitator 102 may operate an electronic marketplace that is open to multiple buyers and sellers and provides commerce related functions through catalogs, exchanges, and/or auctions. In other embodiments, the payment facilitator 102 might act directly as a payment processor. For instance, in some examples, a "payment" might be made using a stored value card, accumulated buyer "points", a store credit, or other instruments. The term payment as utilized herein should be construed to encompass these and other alternative payment types.

In one implementation, the payment processing application 108 is primarily implemented using HTML5. By implementing aspects of the payment processing application 108 utilizing HTML5, the components can be reused across various device types. For instance, the same HTML5 program code might be utilized on mobile devices, such as smartphones and tablet devices, laptops, desktop computers, e-readers, and other types of computing devices. It should be appreciated, however, that although the payment processing application 108 is described herein as being primarily implemented using HTML5, other similar technologies might also be utilized.

In one particular implementation, the payment processing application 108 includes a signature capture page 110. As will be described in greater detail herein, the signature capture page 110 is created using HTML5 and, therefore, can be rendered on a client device such as a smartphone or tablet device. Once rendered, the signature capture page 110 provides functionality for receiving input points 126 of a signature, performing various types of processing on the input points 126, and providing the input points 126 and, potentially, a signature file 130 containing an image of a signature or other data defining the signature that is generated from the input points 126, to the payment facilitator 102. Additional details regarding this functionality will be provided below.

As also shown in FIG. 1, the payment processing application 108 may be utilized to process a payment initiated by a seller device 104. The seller device 104 is a device under the control of an individual or entity that initiates a payment request and to whom the payment is made (i.e. the "payee" or "seller"). In the example shown in FIG. 1, the seller device 104 is a smartphone device. However, as mentioned briefly above, the seller device 104 might be another type of device, such as a tablet computing device, an e-reader, a laptop or desktop computer, or another type of computing device.

In one implementation, the seller device 104 is utilized in conjunction with a magnetic stripe reader 118. The magnetic stripe reader 118 is configured to read a magnetic stripe on a card 120, such as a credit card, a debit card, a gift card, or other type of card containing a magnetic stripe that has been encoded with data. The magnetic stripe reader 118 is also configured to provide the information read from the card 120 to the seller device 104. In this regard, the magnetic stripe reader 118 might utilize various technologies to interface with the seller device 104, such as, but not limited to, audio, Universal Serial Bus ("USB"), wireless, NFC, high frequency audio, and others. It should be appreciated that while a magnetic stripe reader 118 is shown in FIG. 1, the embodiments described herein are not limited to use with the magnetic stripe reader 118. In some embodiments, for instance, credit card or other type of card information might be manually input into the seller device 104 by a cardholder.

In order to complete a mobile payment transaction, the seller device 104 may interface with the payment facilitator 102 by way of a network 106. The network 106 may be a wide area communications network ("WAN"), such as the Internet. Although only a single network 106 is shown in FIG. 1, it should be appreciated that many such networks might be utilized including wired and wireless networks.

In one implementation, the seller device 104 also is configured with a memory 134 that stores a mobile payment processing application 116. The mobile payment processing application 116 may be retrieved from the payment facilitator 102 or another location, such as an application store provided by the payment facilitator 102 or another system.

The mobile payment processing application 116 is a native application that is configured to retrieve HTML5 pages of the payment processing application 108 and to render and display the pages on the seller device 104. In other embodiments, a Web browser application might be utilized in place of the mobile payment processing application 116 to retrieve and render the pages of the payment processing application 108 in order to provide the functionality described herein.

In order to capture a signature, the mobile payment processing application 116 is configured in one implementation to retrieve the signature capture page 110. The mobile payment processing application 116 renders the signature capture page 110 on the seller device 104. When rendered, the signature capture page 110 presents a user interface through which a buyer can provide a signature on the seller device 104. In the example shown in FIG. 1, for instance, a buyer is utilizing their finger 136 to write their signature on a touch screen of the seller device 104. A digitizer in the seller device 104 receives input points 126 that define the signature 124. During the provision of the signature, the seller device 104 might also capture other data, such as the velocity of strokes, the pressure of strokes, the timing of strokes, the order of strokes and, potentially, other types of data that defines the manner in which a signature was made.

As discussed briefly above, some types of devices capture only a relatively low number of input points 126 per unit of time. Accordingly, the signature capture page 110 is configured in some embodiments to smooth display of the signature described by the input points 126. By smoothing the display of the signature 124, a signature 124 can be generated that more truly represents the actual signature input to the seller device 104 by the buyer. The smoothed signature 124 might be displayed on the seller device 104 on a canvas 122, such as an HTML5 canvas.

When the buyer (i.e. the individual making a payment) has completed providing their signature 124, the buyer may select a user interface control, such as the accept button 128, to cause their signature to be submitted to the payment facilitator 102. In this regard, the signature capture page 110 may create a signature file 130 containing the buyer's signature 124. The signature file 130 may be an image file, such as a JPEG, GIF, PNG, or another type of format, such as a vector format, from which the captured signature 124 can be reconstructed. In some embodiments, the signature capture page 110 might also transmit the input points 126 to the payment facilitator 102 and other captured information, such as the velocity, pressure, timing, and order of strokes in a signature.

In response to receiving the signature file 130, the input points 126, and/or other data defining a signature, the payment facilitator 102 may complete the requested payment transaction. For instance, the payment facilitator 102 might transmit details regarding the transaction to the payment processor 114 for completion. Additionally, the payment facilitator 102 might store the signature file 130, the input points 126, and other collected data defining a signature in a signature data store 132 for future use. For instance, as will be described in greater detail below, the payment facilitator 102 might utilized the signature file 130, the input points 126, and other captured data to perform fraud detection during the processing of mobile payment transactions. The payment facilitator 102 might also use the signature file 130, the input points 126, and other captured data for other purposes.

Once the payment transaction has been completed, the payment facilitator 102 might also transmit a receipt with the details of the transaction to the seller device 114 and/or to a device associated with the buyer. The receipt might include the signature file 130 in some implementations. Additional details regarding these and other processes for signature processing will be provided below with regard to FIGS. 2-11.

Figure 2:
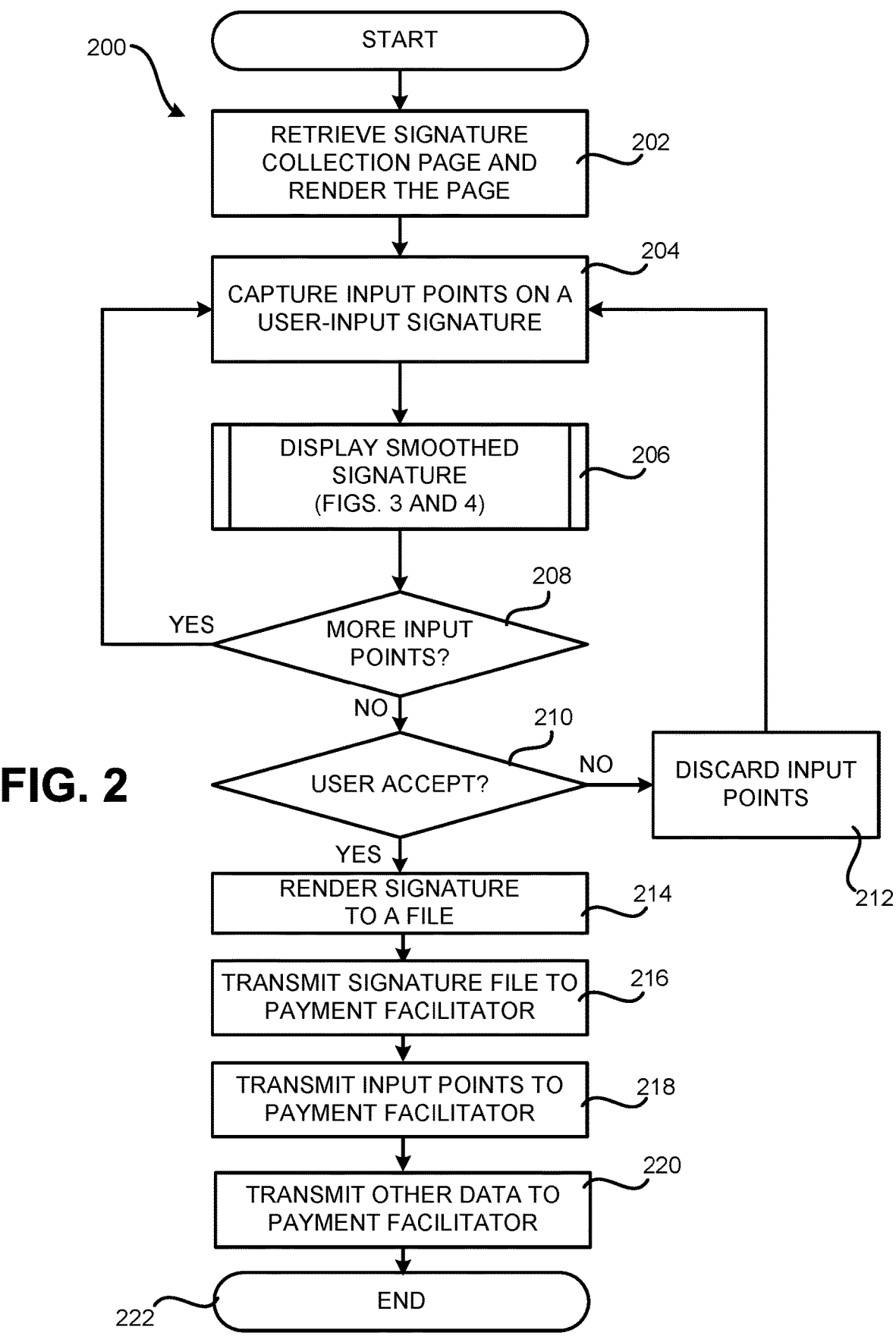
FIG. 2 is a flow diagram showing a routine that illustrates additional aspects of the mechanism shown in FIG. 1 for capturing a signature utilizing an HTML5 application, according to one embodiment presented herein.

FIG. 2 is a flow diagram showing a routine 200 that illustrates additional aspects of the mechanism shown in FIG. 1 for capturing a signature 124 utilizing an HTML5 application payment processing application 108, according to one embodiment presented herein. It should be appreciated that the logical operations described herein with respect to FIG. 2 and the other figures are implemented (1) as a sequence of computer implemented acts or program modules running on a computing system and/or (2) as interconnected machine logic circuits or circuit modules within the computing system.

The implementation of the various components described herein is a matter of choice dependent on the performance and other requirements of the computing system. Accordingly, the logical operations described herein are referred to variously as operations, structural devices, acts, or modules. These operations, structural devices, acts, and modules may be implemented in software, in firmware, in special purpose digital logic, and any combination thereof. It should also be appreciated that more or fewer operations may be performed than shown in the figures and described herein. Some operations might also be performed in parallel, or in a different order than those described herein.

The routine 200 begins at operation 202, where the mobile payment processing application 116 executing on the seller device 104 retrieves the signature capture page 110. The mobile payment processing application 116 then renders the signature capture page 110, thereby providing an appropriate user interface through which a buyer can input their signature 124. Once the user interface has been rendered, the routine 200 proceeds from operation 202 to operation 204, where the signature capture page 110 captures the input points 126 of the user input signature 124. As mentioned above, for instance, a digitizer in the seller device 104 may capture input 126 points as the signature is written across a touch-sensitive display screen. The captured input points 126 may be provided to the signature capture page 110. Other captured information, such as the velocity, pressure, timing, and order of strokes might also be captured and provided to the signature page 110.

From operation 204, the routine 200 proceeds to operation 206 where the signature capture page 110 displays a smoothed signature 124 on an HTML5 canvas 122. Details regarding one illustrative implementation of a routine 300 for smoothing the signature 124 will be provided below with regard to FIGS. 3 and 4.

From operation 206, the routine 200 proceeds to operation 208 where the signature capture page 110 determines whether more input points 126 of the signature 124 remain to be processed. If so, the routine 200 proceeds from operation 208 back to operation 204 where the additional input points 126 are captured and displayed in the manner described below with regard to FIGS. 3 and 4. If no additional input points 126 remain to be processed, the routine 200 proceeds from operation 208 to operation 210.

At operation 210, the signature capture page 110 determines whether a user has accepted their signature 124. For instance, as discussed above, an appropriate user interface control, such as the accept button 128, might be selected in order to indicate acceptance of a signature 124. A similar user interface control might also be provided to allow the user to cancel the submission of their signature.

If the user cancels the submission of their signature 124, the routine 200 proceeds from operation 210 to operation 212 where the input points 126 received by the signature capture page 100 are discarded. The routine 200 then proceeds from operation 212 to operation 204, described above. If, however, at operation 210, the buyer accepts their signature 124, the routine 200 proceeds from operation 210 to operation 214.

At operation 214, the signature capture page 110 renders the smoothed signature to a signature file 130. For instance, the signature capture page 110 might create Portable Network Graphics ("PNG") image containing the smoothed signature provided by the buyer. The signature capture page 110 might also create a vector graphics file containing data representing the smoothed signature. Other types of file formats might also be utilized.

Once the signature 124 has been rendered to the signature file 130, the routine 200 proceeds to operation 216 where the signature capture page 110 transmits the signature file 130 to the payment facilitator 102. In some embodiments, the signature capture page 110 might also transmit the input points 126 and the other captured information to the payment facilitator 102. This occurs at operations 218 and 220, respectively.

As discussed briefly above, the payment facilitator 102 may utilize the signature file 130 to complete the mobile payment transaction. In this regard, the signature file 130 might be transmitted to the payment processor 114 and/or another entity for use in various business purposes associated with the payment transaction. The payment facilitator 102 might also store the signature file 130, the input points 126, and/or the other captured information in the signature data store 132 for future use in fraud detection and/or for other purposes. Additional details regarding some of these uses will be provided below with regard to FIGS. 3-10. From operation 218, the routine 200 proceeds to operation 220, where it ends.

Figure 3:
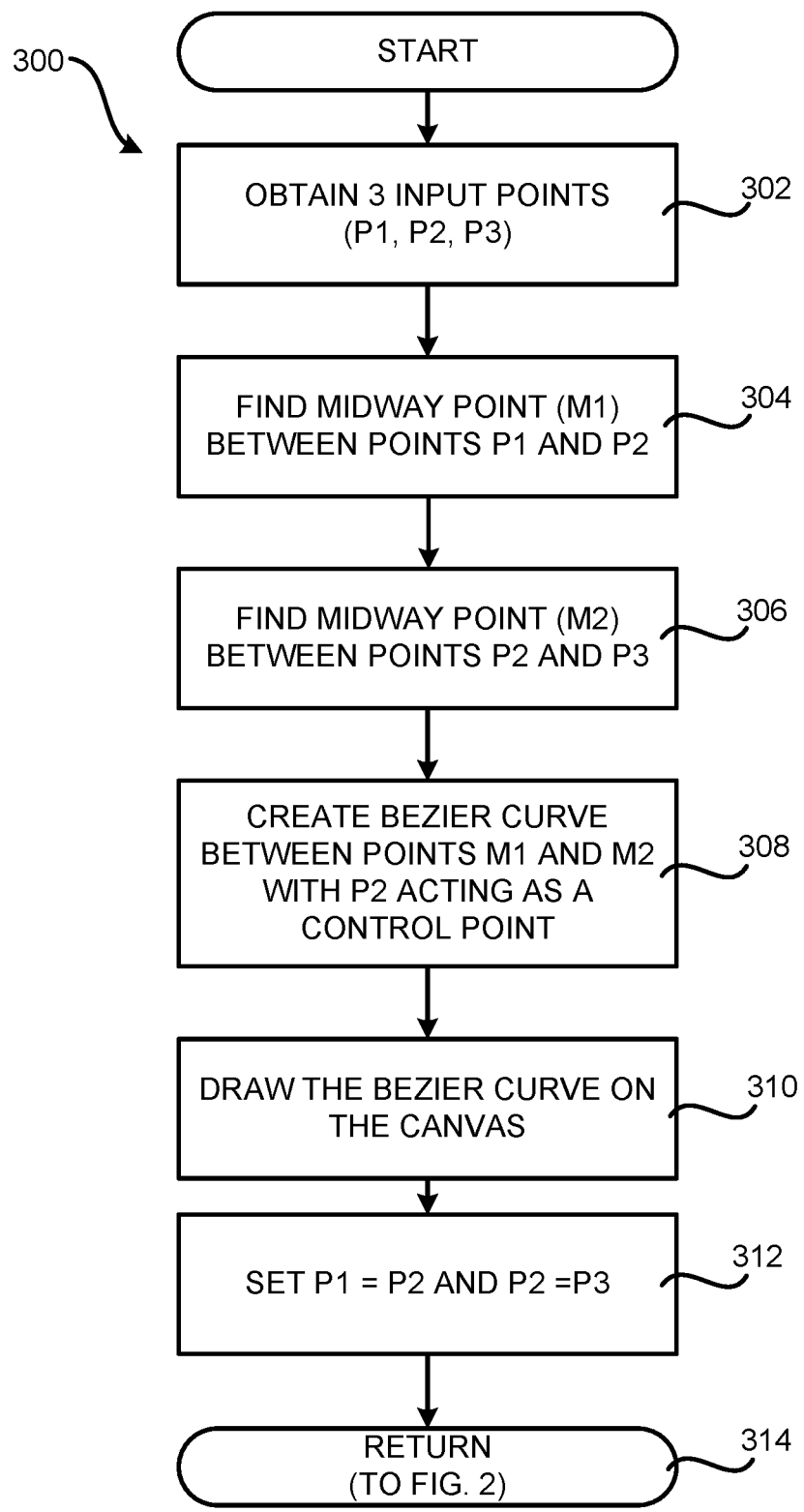
FIG. 3 is a flow diagram showing a routine that illustrates aspects of one mechanism described herein for smoothing a signature captured with an HTML5 application, according to one embodiment disclosed herein.

FIG. 3 is a flow diagram showing a routine 300 that illustrates aspects of one mechanism described herein for smoothing a signature 124 captured with an HTML5 payment processing application 108, according to one embodiment disclosed herein. FIG. 3 will be described in conjunction with FIG. 4, which is a screen diagram illustrating additional aspects of the mechanism shown in FIG. 3 for smoothing a signature 124 captured with an HTML5 application, such as the payment processing application 108.

The routine 300 begins at operation 302, where the signature capture page 110 obtains three input points 126 in one embodiment. For instance, in the example shown in FIG. 4, the first point 126A has an x-coordinate of one and a y-coordinate of three, point 126B has an x-coordinate of two, and a y-coordinate of one, and point three 126A has an x-coordinate of three, and a y-coordinate of two. It should be appreciated that while three input points 126A-126C are processed at a time in one embodiment, other implementations might process another number of input points 126 at a time.

Figure 4:
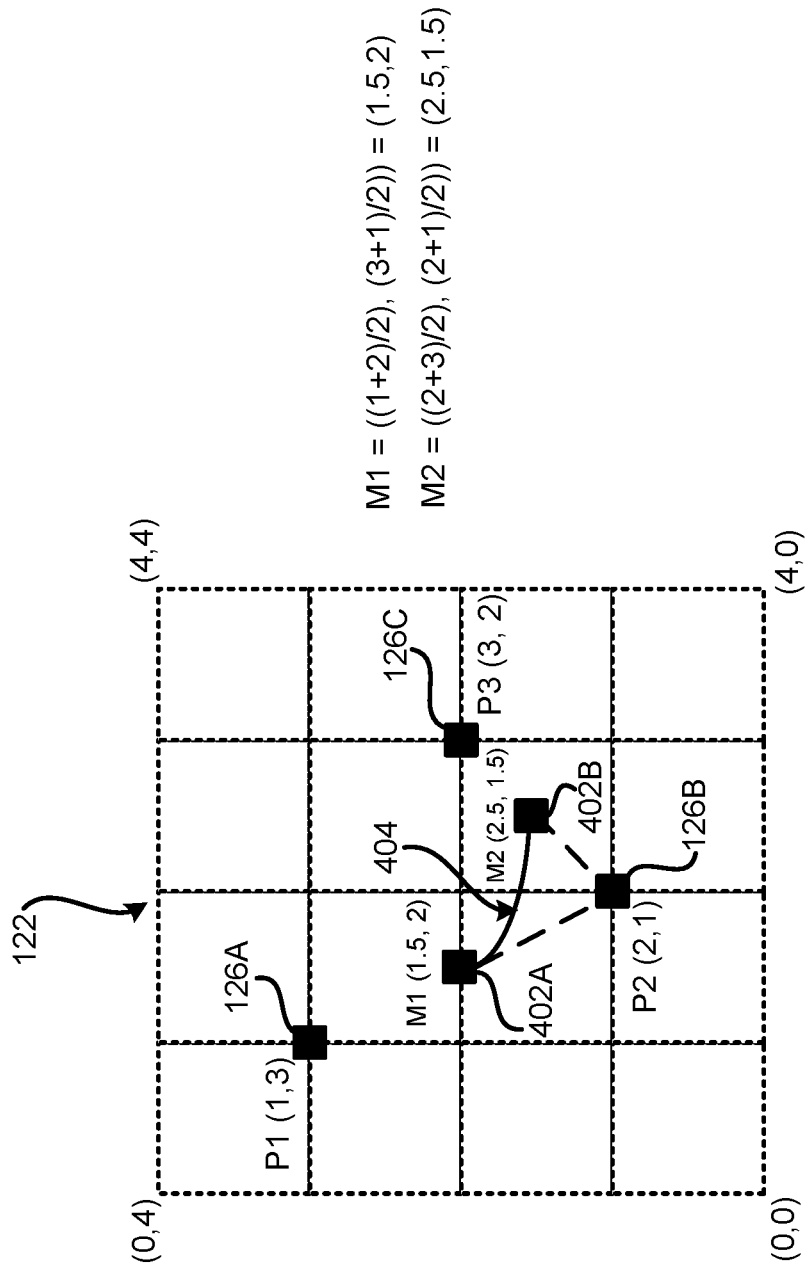
FIG. 4 is a screen diagram that illustrates additional aspects of the mechanism shown in FIG. 3 for smoothing a signature captured with an HTML5 application, according to one embodiment disclosed herein.

From operation 302, the routine 300 proceeds to operation 304 where the signature capture page 110 computes the midway point between the two of the input points. In the example shown in FIG. 4, for instance, the signature capture page 110 computes the midway point 402A between the points 126A and 126B. In this example, the midway point 402A between the point 126A and the point 126B has an x-coordinate of 1.5 and a y-coordinate of two. One illustrative equation for computing the middle point 402A between these two points is shown in FIG. 4. From operation 304, the routine 300 proceeds to operation 306.

At operation 306, the signature capture page 110 computes the midway point 402B between the point 126B and the point 126C. In the example shown in FIG. 4, the middle point 402B has been computed as having an x-coordinate of 2.5 and a y-coordinate of 1.5. From operation 306, the routine 300 proceeds to operation 308.

At operation 308, the signature capture page 110 creates an HTML5 canvas 122. The signature capture page 110 then creates a Bezier curve 404 on the HTML5 canvas 122 between the computed middle points 402A and 402B, with the point 126B acting as a control point for the Bezier curve. The signature capture page 110 then draws the Bezier curve 404 on the HTML5 canvas 102 at operation 310. In some embodiments, the captured pressure and/or velocity information for the signature might be utilized to vary the thickness, texture, or other attribute of the Bezier curve.

From operation 310, the routine 300 proceeds to operation 312 where the signature capture page 110 sets the value of the point 126A to the current value of the point 126B, and sets the value of point 126B to the current value of point 126C. As a new input point 126 is received, the signature capture page 110 will assign the value for the newly captured point to the point 126A. The routine 300 described above with reference to FIG. 3 is then repeated with respect to the new set of three input points 126. Utilizing this mechanism, the signature capture page 110 can be configured to draw a signature 124 on an HTML5 canvas 122 that more truly reflects the actual input to the seller device 104 than if a line was simply drawn between the input points 126. From operation 312, the routine 300 proceeds to operation 314, where processing proceeds in the manner described above with reference to FIG. 2.

Table 1, shown below, includes illustrative HTML5 for performing the routine 300 illustrated in FIG. 3. It should be appreciated that the HTML5 code shown in Table 1 is merely illustrative however, and that the functionality described above may be implemented in other ways.

TABLE 1

```
/ * *
 * Draw a curve on the canvas
 *
 */
function _drawLine( ) {
    var m1 = {x: (_p1.x + _p2.x) / 2, y: (_p1.y + _p2.y) / 2};
    var m2 = {x: (_p2.x + _p3.x) / 2, y: (_p2.y + _p3.y) / 2};
    _ctx.moveTo(m1.x, m1.y);
    _ctx.quadraticCurveTo(_p2.x, _p2.y, m2.x, m2.y);
    _ctx.stroke( );
    _ctx.closePath( );
    _ctx.beginPath( );
    _p1 = _p2;
    _p2 = _p3;
}
```

Figure 5:
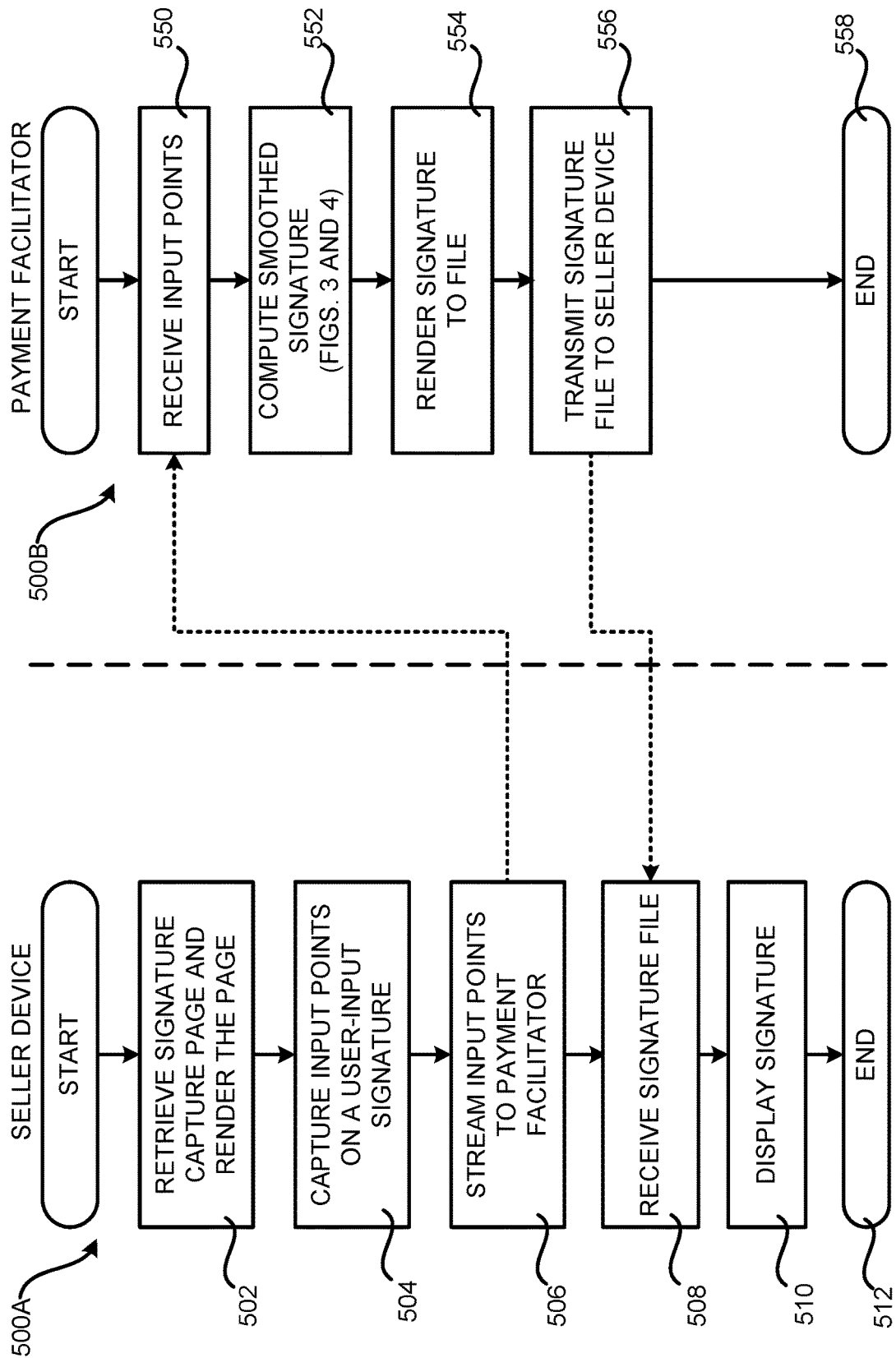
FIG. 5 shows several flow diagrams that illustrate several routines for server-side smoothing of a signature captured with an HTML5 application, according to one embodiment presented herein.

FIG. 5 shows several flow diagrams that illustrate several routines 500A and 500B for server-side smoothing of a signature captured with an HTML5 application, according to one embodiment presented herein. As discussed briefly above, the payment facilitator 102 is configured in one implementation to perform the smoothing process described above with reference to FIGS. 3 and 4. The routine 500A illustrates operations performed by the seller device 104 in such an embodiment, and the routine 500B illustrates operations performed by the payment facilitator 102 in such an embodiment. The routines 500A and 500B will be described together below.

The routine 500A begins at operation 502 where the seller device 104 retrieves the signature capture page 110 and renders the page in the manner described above. The routine 500A then proceeds to operation 504 where the signature capture page 110 captures the input points 126 for a signature 124 as a user writes the signature on the seller device 104. The signature capture page 110 then streams the input points 126 and, potentially, other information to the payment facilitator 102 at operation 506. The input points 126 may be streamed to the payment facilitator 120 as they are received, groups of input points 126 may be packaged and sent together, or all of the input points 126 for a signature may be sent to the payment facilitator 102 at once.

The payment facilitator 102 receives the input points 126 from the signature capture page 110 at operation 550 of the routine 500B. The routine 500B then proceeds to operation 552, where the payment facilitator 102 generates a smooth signature from the received input points 126 in the manner described above with regard to FIGS. 3 and 4. Other algorithms might also be utilized by the payment facilitator 102 to smooth the input points 126 of the input signature 124.

From operation 552, the routine 500 proceeds to operation 554 where the payment facilitator 102 renders the smooth signature to a signature file 130. As described above, for instance, the payment facilitator 102 might create a PNG file that includes an image of the smoothed signature 124. Once the signature file 130 has been created by the payment facilitator 102, the routine 500 proceeds to operation 556 where the payment facilitator 102 transmits the signature file 130 to the seller device 104. The routine 500B then proceeds from operation 556 to operation 558 where it ends.

The seller device 104 receives the signature file 130 at operation 508 of the routine 500A. The signature capture page 110 then displays the signature using the received signature file 130 on an HTML5 canvas 122 in the manner described above. A buyer may then be permitted to accept or reject the displayed signature 124 in the manner described above. From operation 510, the routine 500A proceeds to operation 512, where it ends.

Figure 6:
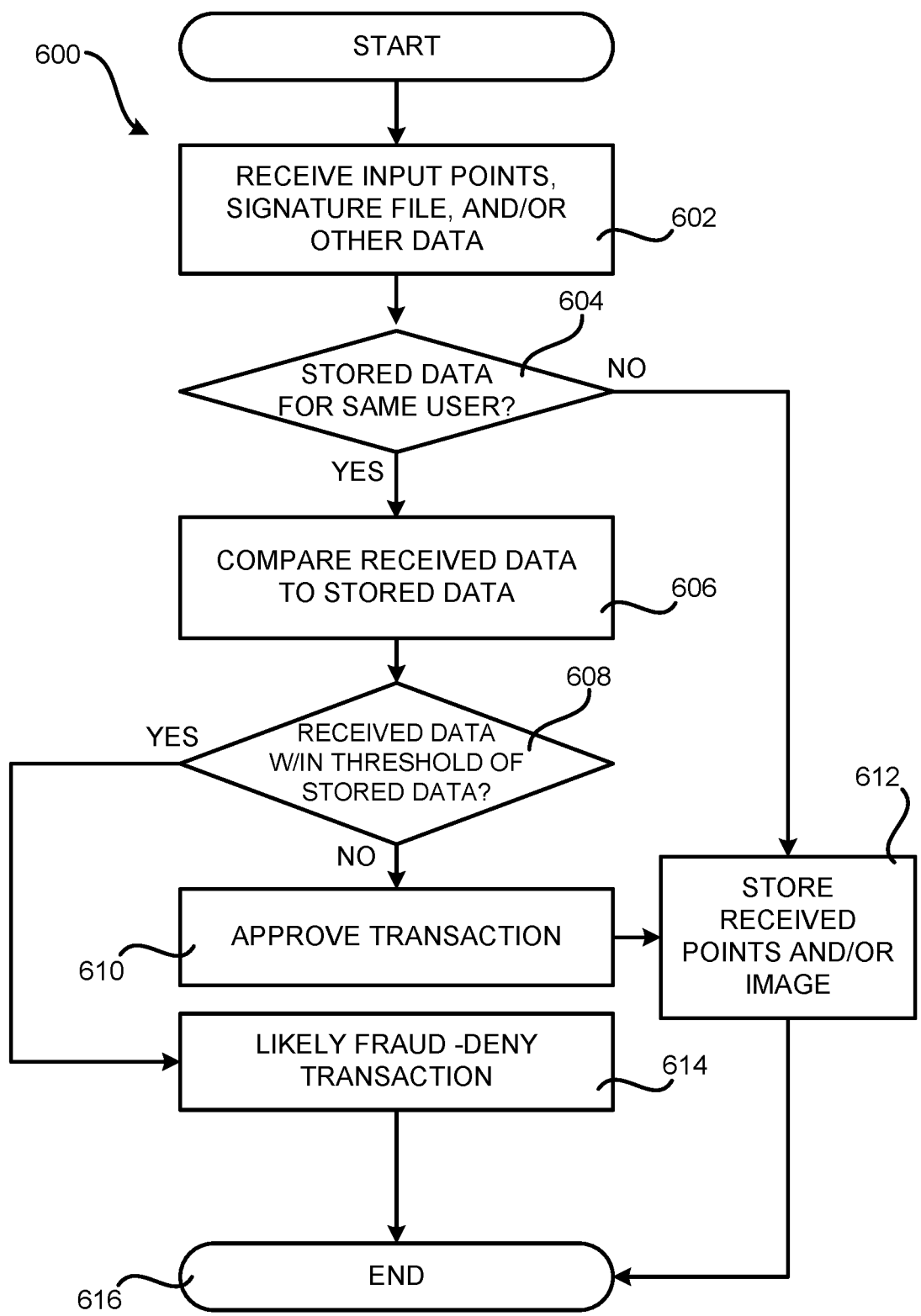
FIG. 6 is a flow diagram showing a routine that illustrates aspects of one mechanism disclosed herein for utilizing input points and/or a signature image captured with an HTML5 application to perform fraud detection, according to one embodiment disclosed herein.

FIG. 6 is a flow diagram showing a routine 600 that illustrates aspects of one mechanism disclosed herein for utilizing input points 126 and/or a signature file 130 captured with an HTML5 application to perform fraud detection, according to one embodiment disclosed herein. As discussed briefly above, the payment facilitator 102 may store the signature file 130, the input points 126, and other captured information defining a signature in a signature data store 132. The payment facilitator 102 may then utilize this data for various purposes, including fraud detection. The routine 600 shown in FIG. 6 illustrates one manner in which the payment facilitator 102 might utilize the signature file 130, the input points 126, and other captured information to detect fraudulent payment transactions.

The routine 600 begins at operation 602, where the payment facilitator 102 receives input points 126, a signature file 130, and/or other captured information, such as velocity, pressure, timing, or stroke order for a signature. The routine 600 then proceeds to operation 604, where the payment facilitator 102 determines whether data defining a signature, such as input points 126 and/or other captured information, have been previously stored at the payment facilitator 102 for the same buyer (i.e. person making the payment). If no data has been previously stored for the current buyer, the routine 600 proceeds from operation 604 to operation 612, where the payment facilitator 102 stores the input points 126, the signature file 130, and/or the other captured data in the signature data store 132. The routine 600 then proceeds from operation 612 to operation 616, where it ends.

If, at operation 604, the payment facilitator 102 determines that it has previously stored data defining the signature of the current buyer, the routine 600 proceeds to operation 606. At operation 606, the payment facilitator 102 compares data defining the signature received in conjunction with the current transaction to the previously stored signature data for the same buyer. In one embodiment, the routine 600 performs the comparison at operation 606 after all input points 126 are received or the signature file 130 is received (e.g., after the user selects the accept button 128 in FIG. 1). In another embodiment, the routine 600 performs the comparison at operation 606 as input points 126 are received (e.g., when the input points are streamed to the payment facilitator). Performing the comparison as input points 126 are received may allow the routine 600 to approve or deny the transaction based on a subset of the input points (e.g., by comparing the first few input points to the stored signature data), which may help reduce system latencies and provide additional time for appropriate action to be taken in the case of suspected fraud (e.g., notifying the financial institution associated with the card 120, notifying the owner of the card 120, notifying an administrator associated with the seller device 104, the payment facilitator 102, or the payment processor, or notifying the proper authorities). The routine 600 then proceeds to operation 608, where the payment facilitator 102 determines whether the received signature data for the current transaction are identical, or within some threshold value of being identical, to the previously stored signature data for the same buyer.

If the received signature data is not identical, or within some threshold value of being identical, to the previously stored signature data, the routine 600 proceeds to operation 610, where the payment facilitator 102 approves the current payment transaction. The payment facilitator 102 might also store the received signature data for use in performing future fraud detection processing.

If, at operation 608, the payment facilitator 102 determines that the received signature data is identical to, or within some threshold value of being identical to, previously stored signature data for the same buyer, the routine 600 proceeds to operation 614. At operation 614, the payment facilitator 102 declines the current payment transaction. This is because receipt of signature data that is identical to, or substantially identical to, previously provided signature data indicates that a malicious attacker may be trying to submit a signature previously generated by the buyer in order to perform a fraudulent transaction at the payment facilitator 102. Because people rarely write their signature in exactly the same way, it is likely that a fraudulent transaction is being attempted when a submitted signature is identical to, or substantially identical to, a previously submitted signature. Accordingly, the payment facilitator 102 will decline a payment transaction under these conditions. From operation 614, the routine 600 proceeds to operation 616, where it ends.

It should be appreciated that the mechanism described with regard to FIG. 6 for detecting fraud based on the input points 126, the signature file 130, and/or other captured data defining a signature is merely illustrative. In other implementations, the payment facilitator 102 might utilize the captured signature data to perform other types of fraud detection processing. For instance, unique characteristics in the input points 126 and/or the signature file 130 might be utilized to identify a particular buyer. In other embodiments, the pressure, velocity, timing, and stroke order of a signature might be utilized to identify fraudulent signatures. Other types of processing might also be performed on the input points 126, the signature file 130, and/or other captured data to detect other types of fraudulent activities.

Figure 7:
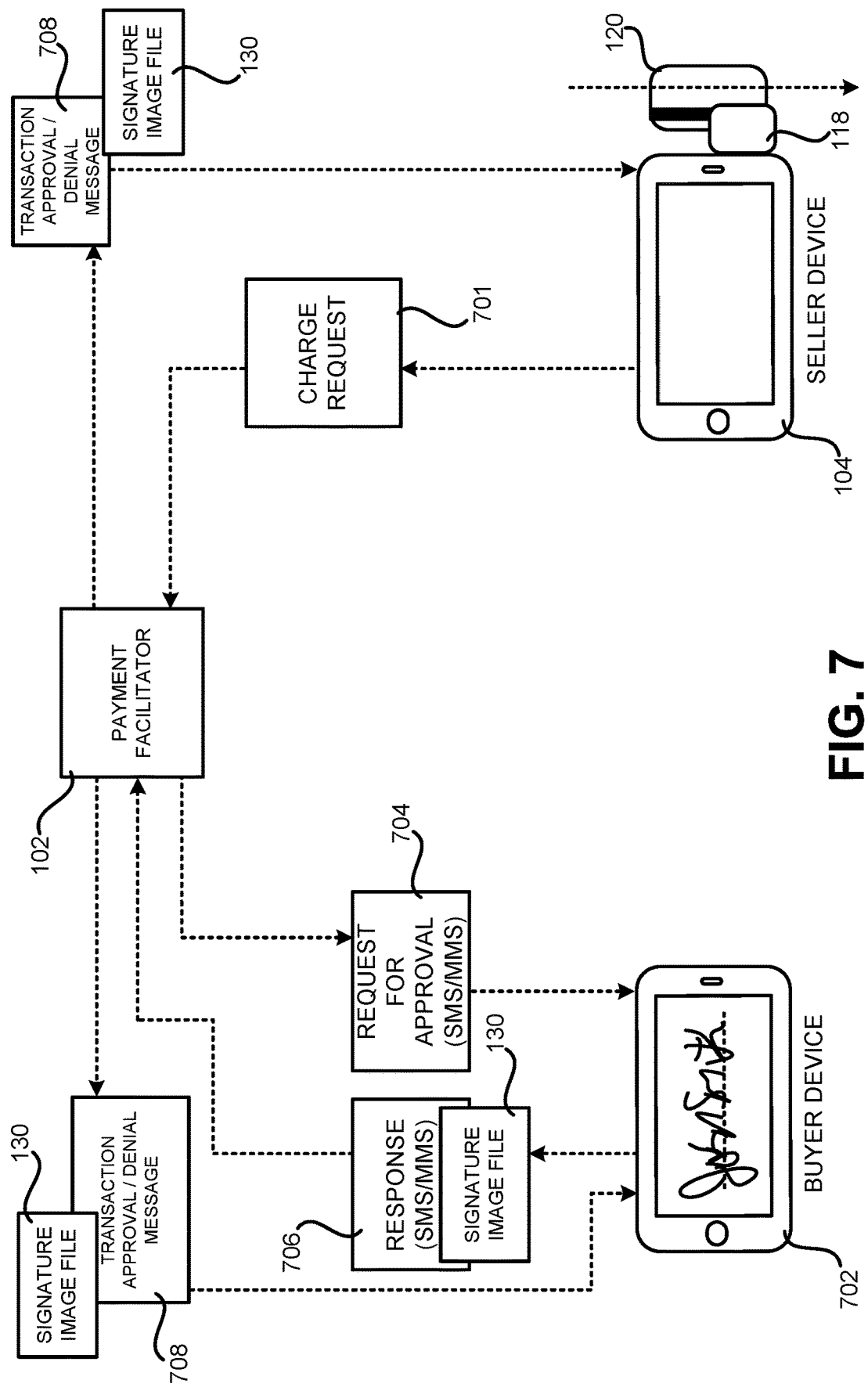
FIG. 7 is a system diagram showing aspects of a mechanism disclosed herein for two-device buyer authentication and transaction approval, which may utilize a signature file captured with an HTML5 application, according to one embodiment disclosed herein.
Figure 8:
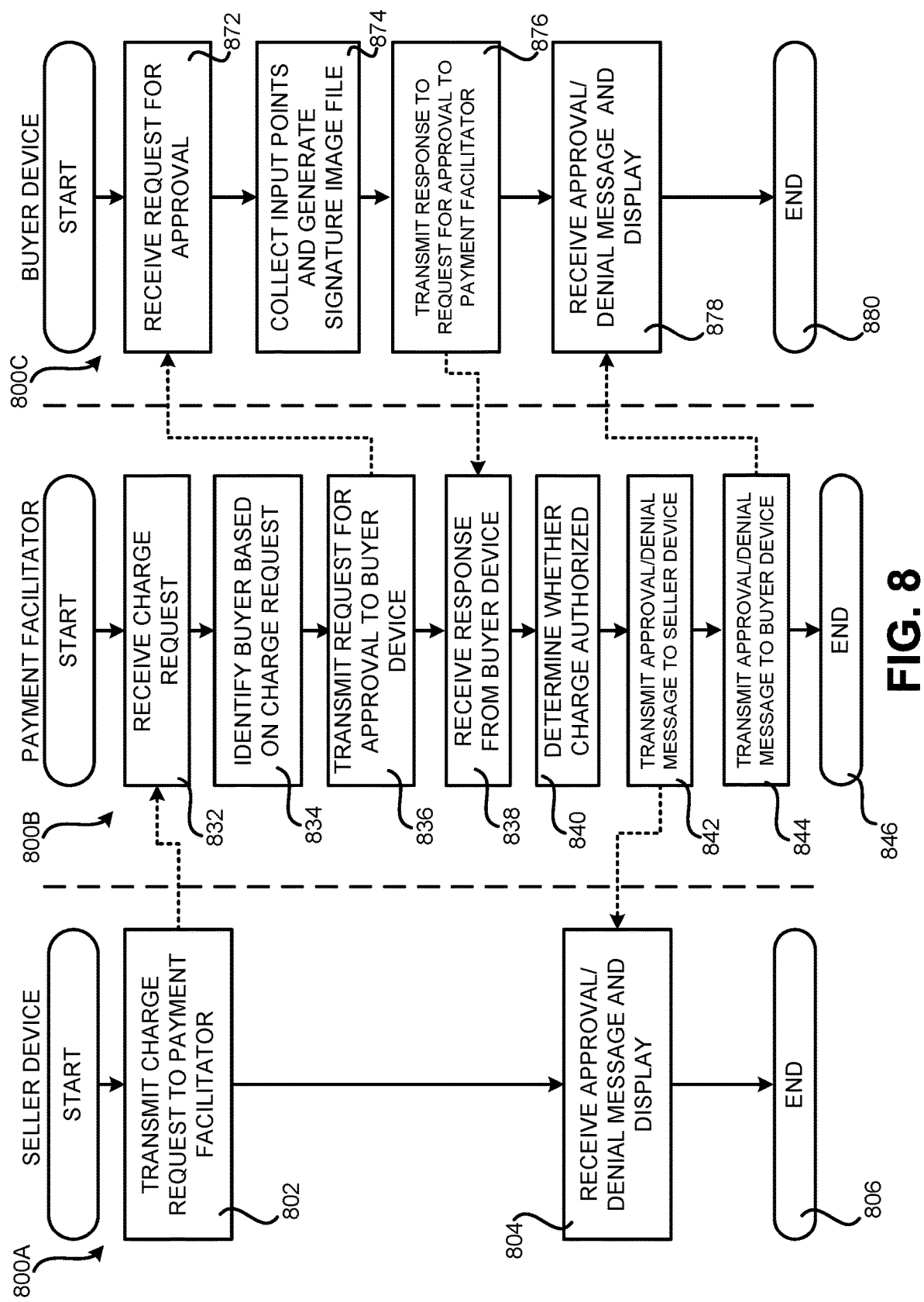
FIG. 8 shows several flow diagrams that illustrate several routines that show additional aspects of the mechanism described in FIG. 7 for two-device buyer authentication and transaction approval, which may utilize a signature file captured with an HTML5 application, according to one embodiment disclosed herein.

FIG. 7 is a system diagram showing aspects of a mechanism disclosed herein for two-device authentication and transaction approval, which may utilize a signature file 130 captured with an HTML5 application, according to one embodiment disclosed herein. As described briefly above, a captured signature 124 might also be utilized in conjunction with mechanisms for authenticating a buyer in connection with a mobile payment transaction. FIGS. 7 and 8 illustrate one such mechanism.

In the embodiment illustrated in FIG. 7, a seller device 104 is equipped with a magnetic stripe reader 118 as set forth above. In order to perform a mobile payment transaction, the magnetic stripe reader 118 may be utilized to read a card 120 and provide the card information to the seller device 104. In turn, the seller device 104 may transmit a charge request 701 to the payment facilitator 102. The charge request 701 is a request to charge an account associated with a buyer for a specified amount. The charge request 701 might also include credit card information, debit card information, or other information obtained from the card 120, along with information identifying the buyer, such as an email address associated with the buyer.

In response to receiving the charge request 701, the payment facilitator 102 identifies an account associated with the buyer. The account information associated with the buyer includes a telephone number or other uniquely identifying information for a buyer device 702. The buyer device 702 may be a smartphone, feature phone, tablet device, or another type of device equipped for communication on a wireless telephone network.

Once the buyer device 702 has been identified, the payment facilitator 102 transmits a request for approval 704 to the buyer device 702. The request for approval 704 is a request for the buyer to approve the charge request 701. In one implementation, the request for approval 704 is sent via an SMS or an MMS message.

In response to receiving the request for approval 704, the buyer device 702 is configured to receive an indication from the buyer as to whether the charge request 701 is approved. Additionally, the buyer device 702 may collect a signature 124 of the buyer in the event that the buyer approves the charge request 701. A signature capture page 110 such as that described above might be utilized on the buyer device 702 to capture the signature file 130 containing the signature 124 of the buyer. Once the buyer has completed providing the signature 124, the buyer device 702 provides a response 706 to the request 704 to the payment facilitator 102. The response 706 might also be sent by way of an MMS or an SMS message in one implementation. The response 706 might also include the signature file 130 that contains the signature 124 of the buyer.

If the buyer has approved the charge request 701, the payment facilitator 102 will complete the requested charge. If the buyer declines the charge request 701, the payment facilitator 102 will not complete the requested charge. The payment facilitator 102 might also transmit a transaction approval/denial message 708 to both the seller device 104 and the buyer device 702. If the charge request 701 is approved, a transaction approval/denial message 708 might also include the signature file 130. Other information might also be included in the transaction denial/approval message 708, including the amount of the charge, the date of the charge, information identifying the seller, the buyer, and potentially other information.

It should be appreciated that, in some embodiments, the buyer device 702 is used as an additional factor in approving or authorizing the charge request 701. For example, the payment facilitator 102 may approve the charge request 701 in response to receiving an indication that the buyer device 702 is in the buyer's possession. In certain embodiments, the payment facilitator 102 confirms that the buyer device 702 is in the buyer's possession by prompting the buyer to input into the buyer device 702 certain information that only the buyer should know, such as a password, recent transactions or purchases made through the payment facilitator 102, or information recently provided to the buyer by the payment facilitator 102 (e.g., a code sent to the buyer device 702 via a different communication channel). By way of another example, the payment facilitator 102 confirms that the buyer device 702 is in the buyer's possession by receiving from the buyer device 702 certain information that is not directly entered into the buyer device 702 by the buyer, such as a key that may be stored in the buyer device 702 or generated by the buyer device 702 or the payment facilitator 102 around the time of the charge request 701. Moreover, multi-factor authentication might be utilized to authenticate the buyer device 702. Multi-factor authentication leverages multiple factors during authentication, such as something the buyer knows (e.g., a password), something the buyer has (e.g., the buyer device 702, a smart card, or a security token), and something the buyer is (e.g., using biometrics). For example, in addition to utilizing an SMS or MMS message, other mechanisms might also be utilized, such as password-based authentication, random numbers, a pre-shared secret in the buyer device 702, multiple secure communications channels, and other mechanisms might also be utilized to authenticate the buyer device 702, the buyer, or both. In the example shown in FIG. 7, for instance, the charge request 701 might be transmitted over a first communications channel (e.g. HTTPS) and the request 704 might be transmitted over a second communications channel (e.g. SMS/MMS) that is different than the first communications channel. By way of another example, the request for approval 704 might be transmitted over a first communications channel (e.g. SMS/MMS) and the response 706 might be transmitted over a second communications channel (e.g. HTTPS). Other types of communications channels might also be utilized. A multi-factor authentication scheme might also be utilized with the mechanism described below with regard to FIGS. 9-10. Additional details regarding the mechanism shown in FIG. 7 will be described below with regard to FIG. 8.

FIG. 8 shows several flow diagrams that illustrate several routines 800A, 800B, and 800C that show additional aspects of the mechanism described in FIG. 7 for two-device authentication and payment transaction approval, which may utilize a signature file 130 captured with an HTML5 application, according to one embodiment disclosed herein. In particular, the routine 800A illustrates operations performed by the seller device 104, the routine 800B illustrates operations performed by the payment facilitator 102, and the routine 800C illustrates operations performed by the buyer device 702 in the embodiment described above with regard to FIG. 7. The routines 800A, 800B, and 800C will be described together in detail below.

The routine 800A begins at operation 802, where the seller device 104 transmits the charge request 701 to the payment facilitator 102. As described above, the charge request 701 is a request to charge an account associated with a buyer. For instance, the charge request 701 may include credit card information obtained manually or through a magnetic stripe reader 118 or in another manner, indicates the amount of the request to charge, and includes information identifying the buyer, such as the buyer's email address.

The routine 800B begins at operation 832, where the payment facilitator 102 receives the charge request 701. The routine 800B then proceeds to operation 834 where the payment facilitator 102 identifies the buyer based upon the information contained in the charge request 701. The payment facilitator 102 might also identify a telephone number associated with the buyer device 702 for use in transmitting the request for approval 704.

From operation 834, the routine 800B proceeds to operation 836 where the payment facilitator transmits the request for approval 704 to the buyer device 702. As discussed above, the request for approval 704 may be transmitted by way of an SMS or MMS message. As mentioned above, other authentication schemes might also be utilized in conjunction with the SMS or MMS message.

The routine 800C begins at operation 872, where the buyer device 702 receives the request for approval 704. In response to receiving the request for approval 704, the routine 800C proceeds to operation 874 where the buyer device 702 collects the input points 126 and generates the signature file 130 in the manner described above. For example, the buyer device 702 may utilize the algorithm described above for smoothing the signature 124 provided by the buyer.

Once the signature file 130 has been generated, the buyer device 702 transmits the response 706 to the payment facilitator 102. As discussed above, the response 706 indicates whether the buyer has approved or declined the charge request 701. The response 706 might include the signature file 130 and might also be transmitted by way of an SMS or MMS message.

At operation 838 of the routine 800B, the payment facilitator 102 receives the response 706 from the buyer device 702. The routine 800B then proceeds to operation 840, where the payment facilitator 102 determines whether the buyer has approved the charge request 701.

The routine 800B then proceeds from operation 840 to operation 842 where the payment facilitator 102 transmits the transaction approval/denial message 708 to the seller device 104. As mentioned above, the transaction approval/denial message 708 may include details regarding the charge and the signature file 130. The seller device 104 receives the transaction approval/denial message 708 at operation 804 of the routine 800A and displays the message 708. The routine 800A then proceeds from operation 804 to operation 806 where it ends.

The routine 800B proceeds from operation 842 to operation 844, where the payment facilitator 102 transmits the transaction approval/denial message 708 to the buyer device 702. As mentioned above, the transaction approval/denial message 708 includes details of the charge and, potentially, the signature file 130. The routine 800B then proceeds from operation 844 to operation 846, where it ends.

The buyer device 702 receives the transaction approval/denial message 708 at operation 878 of the routine 800C. The buyer device 702 then displays the transaction approval/denial message 708 to the buyer. From operation 878, the routine 800C proceeds to operation 880, where it ends.

Figure 9:
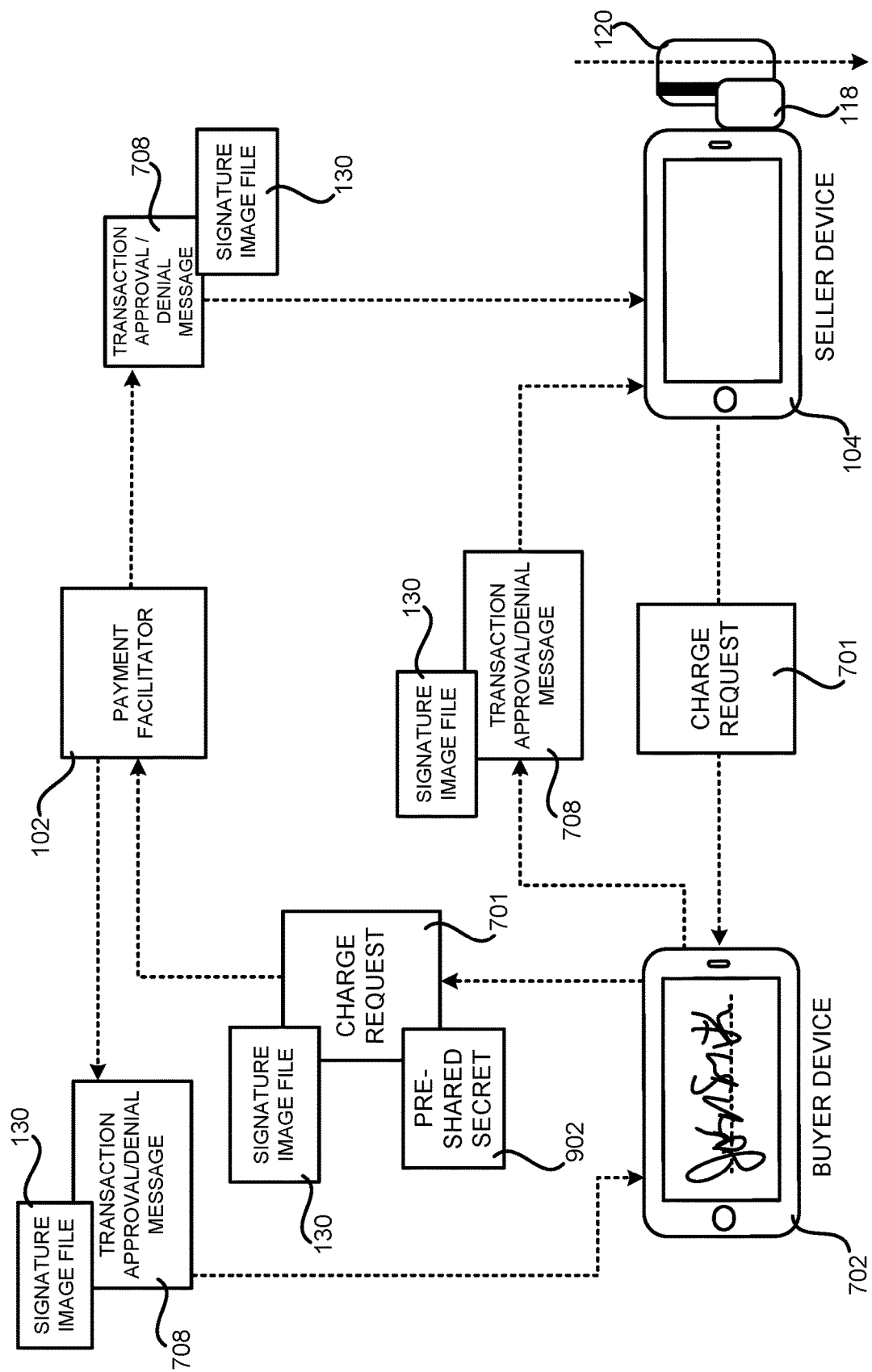
FIG. 9 is a system diagram showing aspects of another mechanism disclosed herein for two-device buyer authentication and transaction approval, which may utilize a signature file captured with an HTML5 application, according to one embodiment disclosed herein.

FIG. 9 is a system diagram showing aspects of another mechanism disclosed herein for two-device buyer authentication and transaction approval, which may utilize a signature file 130 captured with an HTML5 application, according to one embodiment disclosed herein. In the embodiment shown in FIG. 9, the seller device 104 transmits the charge request 701 to the buyer device 702 rather than to the payment facilitator 102. In one implementation, a direct device-to-device transmission mechanism is utilized to transmit the charge request 701 from the seller device 104 to the buyer device 702. For instance, an NFC communications mechanism might be utilized to transmit the charge request 701 to the buyer device 702. Other types of mechanisms might also be utilized, including, but not limited to, Bluetooth®, Wi-Fi, high frequency audio, induction wireless, infrared wireless (such as technologies operating according to specifications and protocols provided by the Infrared Data Association, or IrDA), ultra-wideband formats, and other similar mechanisms. Thus, one or more of radio signal-based data transfer (e.g., Bluetooth®), light-based data transfer (e.g., infrared data transfer), or an acoustic-based data transfer (e.g., sound wave-embedded data) may be used for inter-device communication.

In response to receiving the charge request 701, the buyer device 702 is configured to transmit the charge request 701 to the payment facilitator 102. In one particular implementation, the buyer device 702 might also transmit a pre-shared secret 902 to the payment facilitator 102. A pre-shared secret 902 is a secret generated and stored at the buyer device 702 at the time the buyer device 702 is manufactured. The payment facilitator 102 may store an association between the pre-shared secret 902 and a serial number or other uniquely identifying information for the buyer device 702. The pre-shared secret 902 might be utilized as an encryption key to encrypt the charge request 701 prior to transmission to the payment facilitator 102. The buyer device 702 might also provide the pre-shared secret 902 to the payment facilitator 102 in other ways. As illustrated in FIG. 9, the signature file 130 might also be included with the charge request 701 in the event that the buyer has approved the charge request 701.

In response to receiving the charge request 701 and the pre-shared secret 902, the payment facilitator 102 is configured to determine whether the buyer device 702 is authenticated to approve the charge request 701. For instance, the payment facilitator might compare the pre-shared secret 902 to a list of device serial numbers to determine whether the pre-shared secret 902 matches the actual buyer device 702 that transmitted the charge request 701. If the buyer device 702 can be authenticated in this manner, the payment facilitator 102 will approve the charge request 701.

In response to approving the charge request 701, the payment facilitator 102 may transmit a transaction approval/denial message 708 to both the buyer device 702 and the seller device 104. As discussed above, the transaction approval/denial message 708 might include the signature file 130 along with other information describing the details of the completed mobile payment transaction. Additional details regarding the process illustrated in FIG. 9 will be provided below with respect to FIG. 10.

Figure 10:
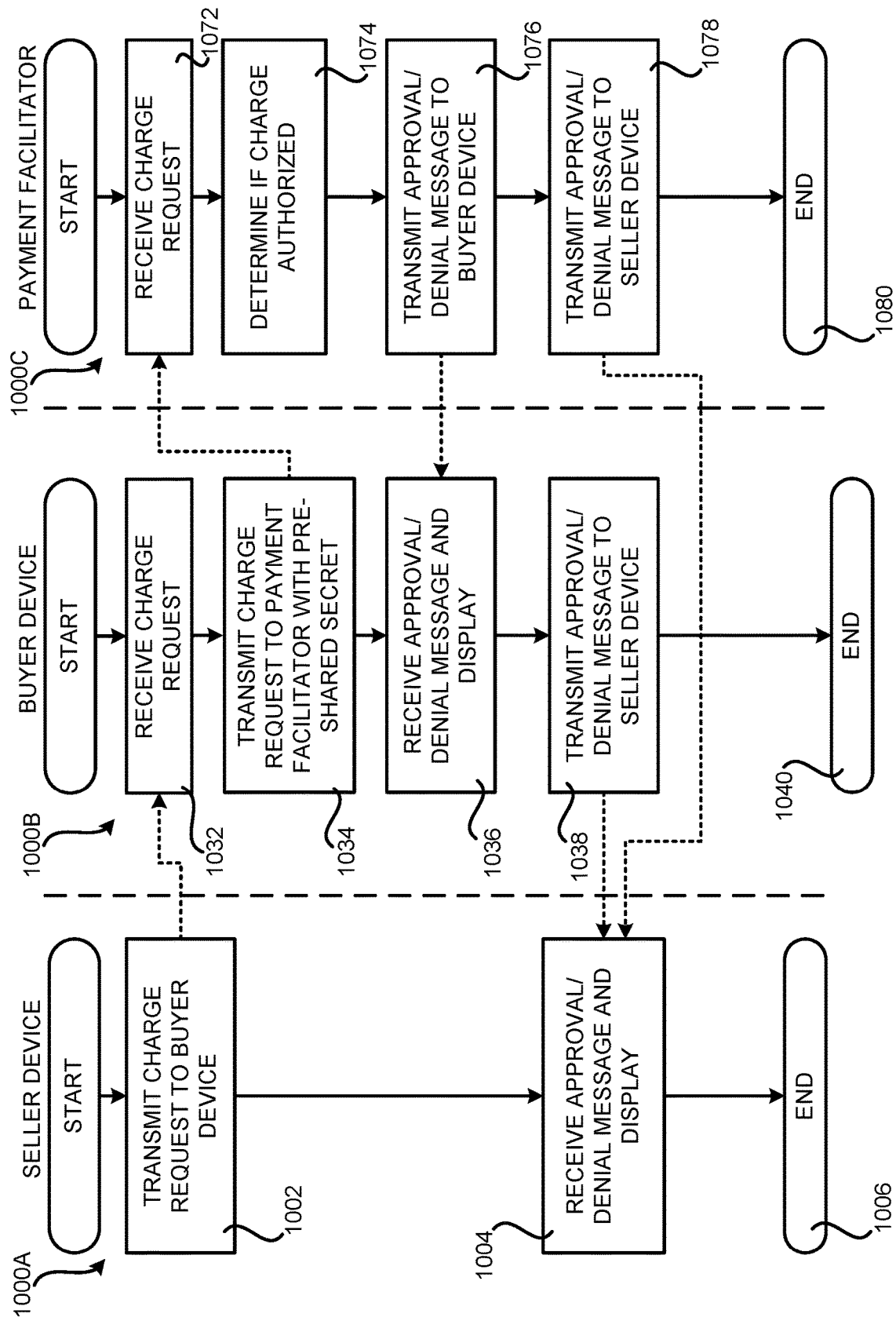
FIG. 10 includes several flow diagrams that illustrate several routines that show additional aspects of the mechanism described in FIG. 9 for two-device buyer authentication and transaction approval, which may utilize a signature file captured with an HTML5 application, according to one embodiment disclosed herein.

FIG. 10 includes several flow diagrams that illustrate several routines 1000A, 1000B, and 1000C that show additional aspects of the mechanism described in FIG. 9 for two-device buyer authentication and payment transaction approval, which may utilize a signature file 130 captured with an HTML5 application, according to one embodiment disclosed herein. In particular, the routine 1000A illustrates aspects of the seller device 104, the routine 1000B illustrates aspects of the buyer device 702, and the routine 1000C illustrates aspects of the payment facilitator 102 with regard to the embodiment described above with regard to FIG. 9. The routines 1000A, 1000B and 1000C will be described together below.

The routine 1000A begins at operation 1002 where the seller device 104 transmits the charge request 701 to the buyer device 702. As mentioned above, a direct device-to-device transmission mechanism, such as an NFC transmission mechanism, may be utilized to transmit the charge request 701 to the buyer device 702. Other types of mechanisms might also be utilized.

The routine 1000B begins at operation 1032, where the buyer device 702 receives the charge request 701 from the seller device 104. The routine 1000B then proceeds to operation 1034 where the buyer device 702 transmits the charge request 701 to the payment facilitator 102 in the manner described above. As also mentioned above, the buyer device 702 might collect the buyer signature 124 and transmit the signature file 130 to the payment facilitator 102 in the event that the buyer approves the charge request 701.

The payment facilitator 102 receives the charge request 701 at operation 1072 of the routine 1000C. The payment facilitator 102 then determines whether the charge request 701 has been approved by the buyer and can be authorized. As discussed above, the pre-shared secret 902 might be utilized to determine whether the charge request 701 can be authorized.

From operation 1074, the routine 1000C proceeds to operation 1076 where the payment facilitator 102 transmits the transaction approval/denial message 708 to the buyer device 702. If the transaction has been approved, the transaction approval/denial message 708 might include the signature file 130. Similarly, at operation 1078, the payment facilitator 102 transmits the transaction approval/denial message 708 to the seller device 104. From operation 1078, the routine 1000C proceeds to operation 1080, where it ends.

The buyer device 702 receives the transaction approval/denial message 708 at operation 1036 of the routine 1000B. The buyer device 702 may then display the transaction approval/denial message 708 to a user of the buyer device 702. Additionally, in some embodiments, the buyer device 702 is configured to transmit the transaction approval/denial message 708 to the seller device 104. This occurs at operation 1038 of the routine 1000B. In these embodiments, the payment facilitator 102 does not transmit a transaction approval/denial message 708 to the seller device 104. From operation 1038, the routine 1000B proceeds to operation 1040, where it ends.

From operation 1002, the routine 1000A proceeds to operation 1004, where the seller device 104 receives the transaction approval/denial message 708 and displays the message to a user of the seller device 104. The routine 1000A then proceeds from operation 1004 to operation 1006 where it ends.

Figure 11:
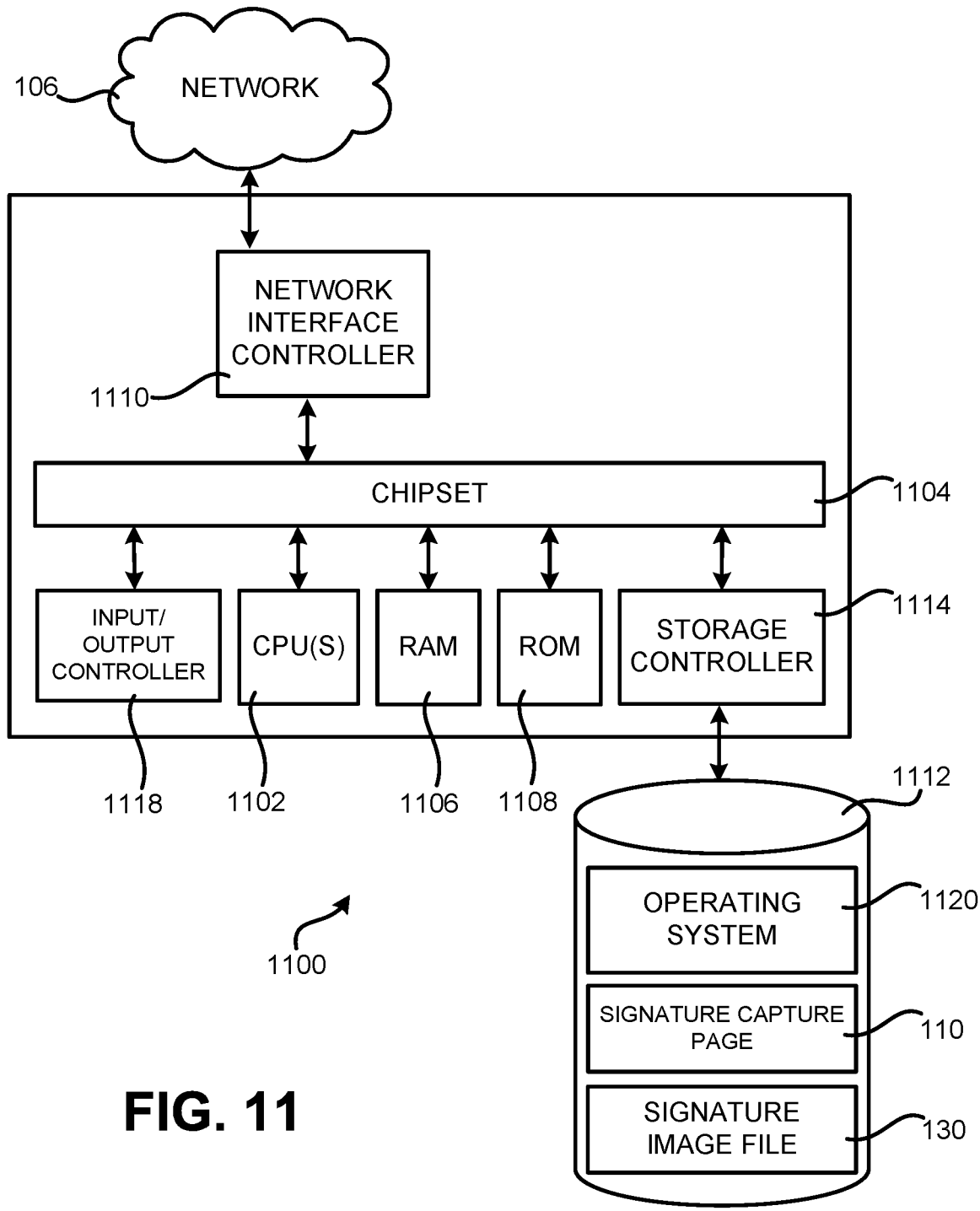
FIG. 11 is a computer architecture diagram showing one illustrative computer hardware architecture for implementing a computing device that might be utilized to implement aspects of the various embodiments presented herein.

FIG. 11 shows an example computer architecture for a computer 1100 capable of executing the program components described above for mobile payment signature processing. The computer architecture shown in FIG. 11 illustrates a conventional server computer, workstation, desktop computer, laptop, tablet, smartphone, network appliance, personal digital assistant ("PDA"), e-reader, digital cellular phone, or other computing device, and may be utilized to execute the various software components presented herein.

The computer 1100 includes a baseboard, or "motherboard," which is a printed circuit board to which a multitude of components or devices may be connected by way of a system bus or other electrical communication paths. In one illustrative embodiment, one or more central processing units ("CPUs") 1102 operate in conjunction with a chipset 1104. The CPUs 1102 may be standard programmable processors that perform arithmetic and logical operations necessary for the operation of the computer 1100.

The CPUs 1102 perform operations by transitioning from one discrete, physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits, including registers, adders-subtractors, arithmetic logic units, floating-point units, and the like.

The chipset 1104 provides an interface between the CPUs 1102 and the remainder of the components and devices on the baseboard. The chipset 1104 may provide an interface to a random access memory ("RAM") 1106, used as the main memory in the computer 1100. The chipset 1104 may further provide an interface to a computer-readable storage medium such as a read-only memory ("ROM") 1108 or non-volatile RAM ("NVRAM") for storing basic routines that help to startup the computer 1100 and to transfer information between the various components and devices. The ROM 1108 or NVRAM may also store other software components necessary for the operation of the computer 1100 in accordance with the embodiments described herein.

The computer 1100 may operate in a networked environment using logical connections to remote computing devices and computer systems through a network, such as the local area network 304. The chipset 1104 may include functionality for providing network connectivity through a NIC 1110, such as a gigabit Ethernet adapter. The NIC 1110 is capable of connecting the computer 1100 to other computing devices over the network 304. It should be appreciated that multiple NICs 1110 may be present in the computer 1100, connecting the computer to other types of networks and remote computer systems.

The computer 1100 may be connected to a mass storage device 1112 that provides non-volatile storage for the computer. The mass storage device 1112 may store system programs, application programs, other program modules, and data, which have been described in greater detail herein. The mass storage device 1112 may be connected to the computer 1100 through a storage controller 1114 connected to the chipset 1104. The mass storage device 1112 may consist of one or more physical storage units. The storage controller 1114 may interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 1100 may store data on the mass storage device 1112 by transforming the physical state of the physical storage units to reflect the information being stored. The specific transformation of physical state may depend on various factors, in different implementations of this description. Examples of such factors may include, but are not limited to, the technology used to implement the physical storage units, whether the mass storage device 1112 is characterized as primary or secondary storage, and the like.

For example, the computer 1100 may store information to the mass storage device 1112 by issuing instructions through the storage controller 1114 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 1100 may further read information from the mass storage device 1112 by detecting the physical states or characteristics of one or more particular locations within the physical storage units.

In addition to the mass storage device 1112 described above, the computer 1100 may have access to other computer-readable storage media to store and retrieve information, such as program modules, data structures, or other data. It should be appreciated by those skilled in the art that computer-readable storage media can be any available media that provides for the storage of non-transitory data and that may be accessed by the computer 1100.

By way of example, and not limitation, computer-readable storage media may include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

The mass storage device 1112 may store an operating system 1116 utilized to control the operation of the computer 1100. According to one embodiment, the operating system comprises the LINUX operating system. According to another embodiment, the operating system comprises the WINDOWS® SERVER operating system from MICROSOFT Corporation. According to further embodiments, the operating system may comprise the UNIX or SOLARIS operating systems. It should be appreciated that other operating systems may also be utilized. The mass storage device 1112 may store other system or application programs and data utilized by the computer 1100, such as the signature capture page 110, the signature file 130, and/or the other software components and data described above. The mass storage device 1112 might also store other programs and data not specifically identified herein.

In one embodiment, the mass storage device 1112 or other computer-readable storage media is encoded with computer-executable instructions which, when loaded into the computer 1100, transforms the computer from a general-purpose computing system into a special-purpose computer capable of implementing the embodiments described herein. These computer-executable instructions transform the computer 1100 by specifying how the CPUs 1102 transition between states, as described above. According to one embodiment, the computer 1100 has access to computer-readable storage media storing computer-executable instructions which, when executed by the computer 1100, perform the routine 400, described above with regard to FIG. 4.

The computer 1100 may also include an input/output controller 1118 for receiving and processing input from a number of input devices, such as a keyboard, a mouse, a touchpad, a touch screen, an electronic stylus, or other type of input device. Similarly, the input/output controller 1118 may provide output to a display, such as a computer monitor, a flat-panel display, a digital projector, a printer, a plotter, or other type of output device. It will be appreciated that the computer 1100 may not include all of the components shown in FIG. 11, may include other components that are not explicitly shown in FIG. 11, or may utilize an architecture completely different than that shown in FIG. 11.

Based on the foregoing, it should be appreciated that technologies for mobile payment signature processing have been presented herein. Although the subject matter presented herein has been described in language specific to computer structural features, methodological acts, and computer readable media, it is to be understood that the invention defined in the appended claims is not necessarily limited to the specific features, acts, or media described herein. Rather, the specific features, acts, and mediums are disclosed as example forms of implementing the claims.

The subject matter described above is provided by way of illustration only and should not be construed as limiting. Furthermore, the claimed subject matter is not limited to implementations that solve any or all disadvantages noted in any part of this disclosure. Various modifications and changes may be made to the subject matter described herein without following the example embodiments and applications illustrated and described, and without departing from the true spirit and scope of the present invention, which is set forth in the following claims.

What is claimed is:

1. A computer-implemented method for authorizing or declining a transaction based upon a signature, the method comprising performing computer-implemented operations for:
    receiving a portion of data defining a signature of a customer at a payment facilitator, the portion of the data being less than an entirety of the data;
    determining whether the portion of the data has been previously stored at the payment facilitator;
    in response to determining that the portion of the data has been previously stored at the payment facilitator and as one or more additional portions of the data are being received, comparing the portion of the data to previously stored data defining the signature of the customer; and
    prior to receiving the entirety of the data, determining that a transaction associated with the portion of the data is fraudulent and declining the transaction in response to determining that the portion of the data and the previously stored data are identical, wherein determining that the portion of the data and the previously stored data are identical comprises determining that the portion of the data and the previously stored data are within a threshold value of being identical.

2. The computer-implemented method of claim 1, wherein the data comprises a plurality of input points on a signature captured by a client device.

3. The computer-implemented method of claim 1, wherein the data comprises one or more of pressure data, velocity data, timing data, or stroke order for the signature captured by a client device.

4. The computer-implemented method of claim 1, wherein the data comprises a signature file rendered at a client device.

5. The computer-implemented method of claim 1, further comprising in response to receiving additional data defining an additional signature of the customer, determining that the additional data and the previously stored data are not within the threshold value of being identical:
    approving the transaction; and
    storing the additional data.

6. The computer-implemented method of claim 1 wherein:
    the previously stored data comprises previous data points and the portion of the data comprises current data points;
    comparing the portion of the data to the previously stored data comprises, after receiving a first number of the current data points, comparing the current data points to the previous data points; and
    declining the transaction comprises declining the transaction in response to determining that the current data points and the previous data points are within the threshold value of being identical.

7. The computer-implemented method of claim 1 and further comprising replacing the previously stored data with the portion of the data.

8. The computer-implemented method of claim 1 wherein:
    the previously stored data comprises previous data points and the portion of the data comprises current data points;
    comparing the portion of the data to the previously stored data comprises, after receiving all the current data points, comparing all the current data points to the previous data points; and
    declining the transaction comprises declining the transaction in response to determining that all the current data points and the previous data points are within the threshold value of being identical.

9. One or more non-transitory computer-readable storage media comprising instructions executable by one or more processors to cause a computing device to perform operations comprising:
    receiving a portion of data defining a signature of a customer at a payment facilitator, the portion of the data being less than an entirety of the data;
    determining whether the portion of the data has been previously stored at the payment facilitator;
    in response to determining that the portion of the data has been previously stored at the payment facilitator, comparing the portion of the data to previously stored data defining the signature of the customer;
    prior to receiving the entirety of the data, declining a transaction in response to determining that the portion of the data and the previously stored data are identical, wherein determining that the portion of the data and the previously stored data are identical comprises determining that the portion of the data and the previously stored data are within a threshold value of being identical; and
    based at least in part on declining the transaction, transmitting a denial message to a client device associated with the customer.

10. The computer-readable storage medium of claim 9, wherein the data comprises a plurality of input points on a signature captured by the client device.

11. The computer-readable storage medium of claim 9, wherein the data comprises one or more of pressure data, velocity data, timing data, or stroke order for the signature captured by the client device.

12. The computer-readable storage medium of claim 9, wherein the data comprises a signature file rendered at the client device.

13. The computer-readable storage medium of claim 9, wherein, in response to receiving additional data defining an additional signature of the customer, the instructions cause the computing device to perform operations further comprising:
    determining that the additional data and the previously stored data are not within the threshold value of being identical;
    approving the transaction;
    storing the additional data; and
    based at least in part on approving the transaction, transmitting an approval message to the client device.

14. The computer-readable storage medium of claim 9, wherein:
    the previously stored data comprises previous data points and the portion of the data comprises current data points;
    comparing the portion of the data to the previously stored data comprises, after receiving a first number of the current data points, comparing the current data points to the previous data points; and
    declining the transaction comprises declining the transaction in response to determining that the current data points and the previous data points are within the threshold value of being identical.

15. A system comprising:
    one or more processors; and
    one or more computer-readable media storing computer-executable instructions that, when executed, cause the one or more processors to perform operations comprising:
        receiving a portion of data defining a signature of a customer at a payment facilitator associated with a seller device, the portion of the data being less than an entirety of the data;
        determining whether the portion of the data has been previously stored at the payment facilitator;
        in response to determining that the portion of the data has been previously stored at the payment facilitator, comparing the portion of the data to previously stored data defining the signature of the customer;
        prior to receiving the entirety of the data, declining a transaction in response to determining that the portion of the data and the previously stored data are identical, wherein determining that the portion of the data and the previously stored data are identical comprises determining that the portion of the data and the previously stored data are within a threshold value of being identical; and
        based at least in part on declining the transaction, transmitting a denial message to the seller device.

16. The system of claim 15, wherein the data comprises a plurality of input points on a signature captured by a client device.

17. The system of claim 15, wherein the data comprises one or more of pressure data, velocity data, timing data, or stroke order for the signature captured by a client device.

18. The system of claim 15, wherein the data comprises a signature file rendered at a client device.

19. The system of claim 15, wherein, in response to receiving additional data defining an additional signature of the customer, the computer-executable instructions cause the computing device to perform operations further comprising:
    determining that the additional data and the previously stored data are not within the threshold value of being identical;
    approving the transaction;

storing the additional data; and based at least in part on approving the transaction, transmitting an approval message to the seller device.

20. The system of claim 15, wherein:

the previously stored data comprises previous data points and the portion of the data comprises current data points;

comparing the portion of the data to the previously stored data comprises, after receiving a first number of the current data points, comparing the current data points to the previous data points; and declining the transaction comprises declining the transaction in response to determining that the current data points and the previous data points are within the threshold value of being identical.

* * * * *